United States Patent

[11] 3,588,878

[72] Inventors Michel L. Avignon
Neuilly-sur-Seine, France;
Joseph L. Mader, Dietlikon, Switzerland

[21] Appl. No. 692,927
[22] Filed Dec. 22, 1967
[45] Patented June 28, 1971
[73] Assignee International Standard Electric Corporation
New York,
[32] Priority Jan. 12, 1967
[33] France
[31] 90,861

[54] CENTERING ARRANGEMENT FOR A TERNARY CODER
10 Claims, 9 Drawing Figs.

[52] U.S. Cl. .......... 340/347
[51] Int. Cl. .......... H03k 13/24
[50] Field of Search .......... 340/347 (A/D), 347

[56] References Cited
UNITED STATES PATENTS

| | | | |
|---|---|---|---|
| 3,032,610 | 5/1962 | Villars .......... | 340/347 |
| 3,365,713 | 1/1968 | Avignon et al. .......... | 340/347 |
| 3,210,528 | 10/1965 | Magill et al. .......... | 340/347X |

*Primary Examiner*—Maynard R. Wilbur
*Assistant Examiner*—Michael K. Wolensky
*Attorneys*—C. Cornell Remsen, Jr., Rayson P. Morris, Percy P. Lantzy, Philip M. Bolton and Isidore Togut

ABSTRACT: A calibration voltage is periodically coupled to a feedback comparison ternary coder during calibration time to generate a ternary calibration code of all ternary 1 digits when the coder is properly centered. An arrangement examines each ternary digit starting from the most significant digit to detect a deviation from the desired calibration code represented by the first ternary digit different from ternary 1 and appropriately adjusts the reference voltage of the coder to compensate for this deviation.

Inventors
MICHEL L. AVIGNON
JOSEPH L. MADER
By Alfred C. Hill
Agent

Inventors
MICHEL L. AVIGNON
JOSEPH L. MADER
By Alfred C. Hill
Agent

Inventors
MICHEL L. AVIGNON
JOSEPH L. MADER
By Alfred C. Hill
Agent

CENTERING ARRANGEMENT FOR A TERNARY CODER

BACKGROUND OF THE INVENTION

This invention relates to ternary coders and more particularly to an automatic centering arrangement for feedback comparison ternary coders to increase the accuracy thereof.

In a feedback comparison coder, whether it is a binary coder, a ternary coder or decimal coder, a sequential series of comparisons are made between the analog voltage to be coded and a voltage delivered by a decoder for determining successively the digits of the code number in a decreasing weight order.

In such a coder the same number No, which will be called "check or calibration code," must be obtained each time a calibration voltage $e_0$ is coded. This does not happen in practice due to the variations of the DC voltages added to the analog signal to be coded and variations of the component characteristics so that the number obtained in coding the calibration voltage differs by a quantity of $\Delta$ N from the nominal value O. It can be stated that the accuracy of the coder increases as the maximum value of the deviation $\Delta$ N is decreased.

SUMMARY OF THE INVENTION

In accordance with the present invention, the deviation is reduced by means of a feedback loop in which, after having determined the sign of the deviation obtained by coding the calibration voltage $e_0$, the amplitude of one of the DC voltages is corrected periodically, the direction of the correction being such that the deviation is reduced. This is referred to as centering correction for the coder. The amplitude $e_0$ of the calibration voltage ranges between the voltages 0 and Ec which defines the range of coding and, when the checking code obtained by coding this signal $e_0$ is determined, the sign of the deviation is obtained by comparison or by subtraction. In the case of a binary code, if $e_0$=Ec/2, the check code or calibration code No (which comprises $n$ digits) can indifferently present one of the values $2^{n-1}-1$ or $2^{n-1}$. Since all the numbers of the value lower than or equal to $2^{n-1}-1$ have a digit of rank 1 equal to 0 and all the numbers of value higher than or equal to $2^{x11}$ have a digit of rank 1 equal to 1, the sign of the deviation is obtained by examining the value of this digit.

In the case of a ternary code, the procedure is different. For instance, if $e_0$=Ec/2 and $n$=4 then the code 1111 is obtained for a deviation lower than ±1/2 Q (Q being the value of one quantizing step); the code 1110 or 1112 is obtained for a deviation ranging between ±1/2 Q and ±1.5 Q; and the code 1100, 1101, 1102, or 1120, 1121, 1122 is obtained for a deviation ranging between ±1.5 Q and ±2.5 Q etc.

In order to determine the sign of the deviation, it is thus necessary to examine all the pairs of binary bits with each pair of binary bits representing a ternary digit starting from that pair of binary digits which represents the most significant ternary digit. Thus, for a deviation higher than ±2.5 Q, the deviation sign is given by the value of the ternary digit of rank 3.

An object of the present invention is to provide an automatic centering arrangement for a feedback comparison ternary coder which corrects periodically the centering of the ternary coder in order to minimize the effect of the variation of DC voltages and of the components in the coder.

A feature of this invention is the provision of an automatic centering arrangement for a feedback comparison ternary coder comprising first means to periodically couple a calibration voltage to the coder during calibration time for providing a given ternary calibration code when the coder is properly centered; and second means coupled to the coder to detect a deviation from the given calibration code during the calibration time and adjust the coder to compensate for the deviation.

Another feature of this invention is the provision that a calibration signal having an amplitude equal to half the maximum amplitude of the coding range is applied to the coder which if properly operating will produce a check or calibration code which, expressed in ternary code, must comprise only 1's. An arrangement is provided to successively examine all the digits of the code being produced from the calibration voltage starting from the most significant ternary digit with the direction of the deviation being given by the value of the first digit different from ternary 1 and that the said deviation is corrected by modifying the value of the reference voltage used for coding, this voltage being increased if the ternary digit is in condition 2 and decreased if this digit is in ternary condition 0.

BRIEF DESCRIPTION OF THE DRAWING

The above mentioned other features and objects of this invention will become apparent by reference to the following description taken in conjunction with the accompanying drawings, in which.

FIGS. **1*a* to 1*e* illustrate a number of logical symbols utilized in the block diagrams of FIGS. 4 and 5**.

DESCRIPTION OF THE PREFERRED EMBODIMENT

Before describing the invention, logical algebra notations will be discussed which will be used herein in order to simplify the description of the logical operations. The subject is treated extensively in numerous papers and in particular in the book "Logical Design of Digital Computers" by M. Phister (J. Wiley - publisher).

Thus, if a condition characterized by the presence of a signal is written A, the condition characterized by the absence of said signal will be written $\bar{A}$.

These two conditions are linked by the well known logical relation $A \times \bar{A}=0$, in which the sign × is the symbol of the coincidence logical function or AND function.

If a condition C appears only if the conditions A and B are simultaneously present, the logical expression is A×B=C and this function may be carried out by means of a coincidence or AND gate.

If a condition C appears when at least one of two conditions E and F is present, the logical expression is E +F=C and this function is carried out by means of a mixing gate or OR gate.

Figure 4:
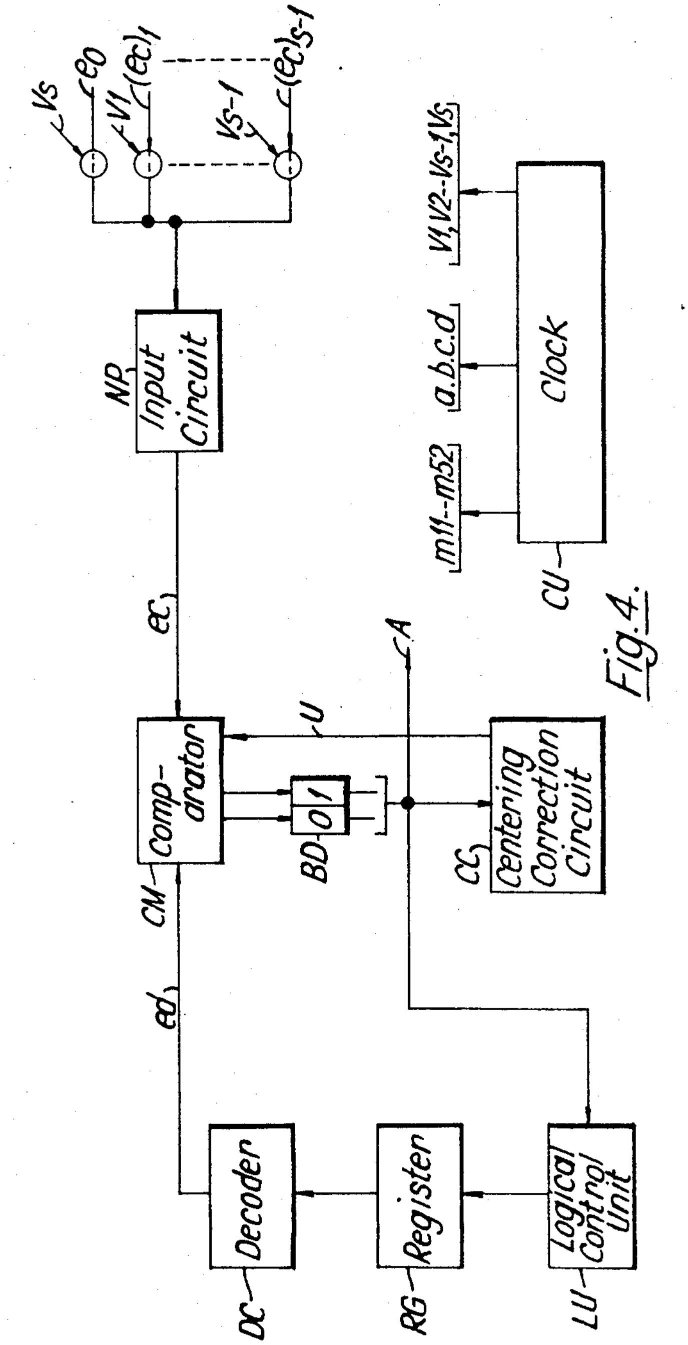
FIG. 4 illustrates a block diagram of the centering arrangement for a feedback comparison type ternary coder in accordance with the principles of this invention.
Figure 5:
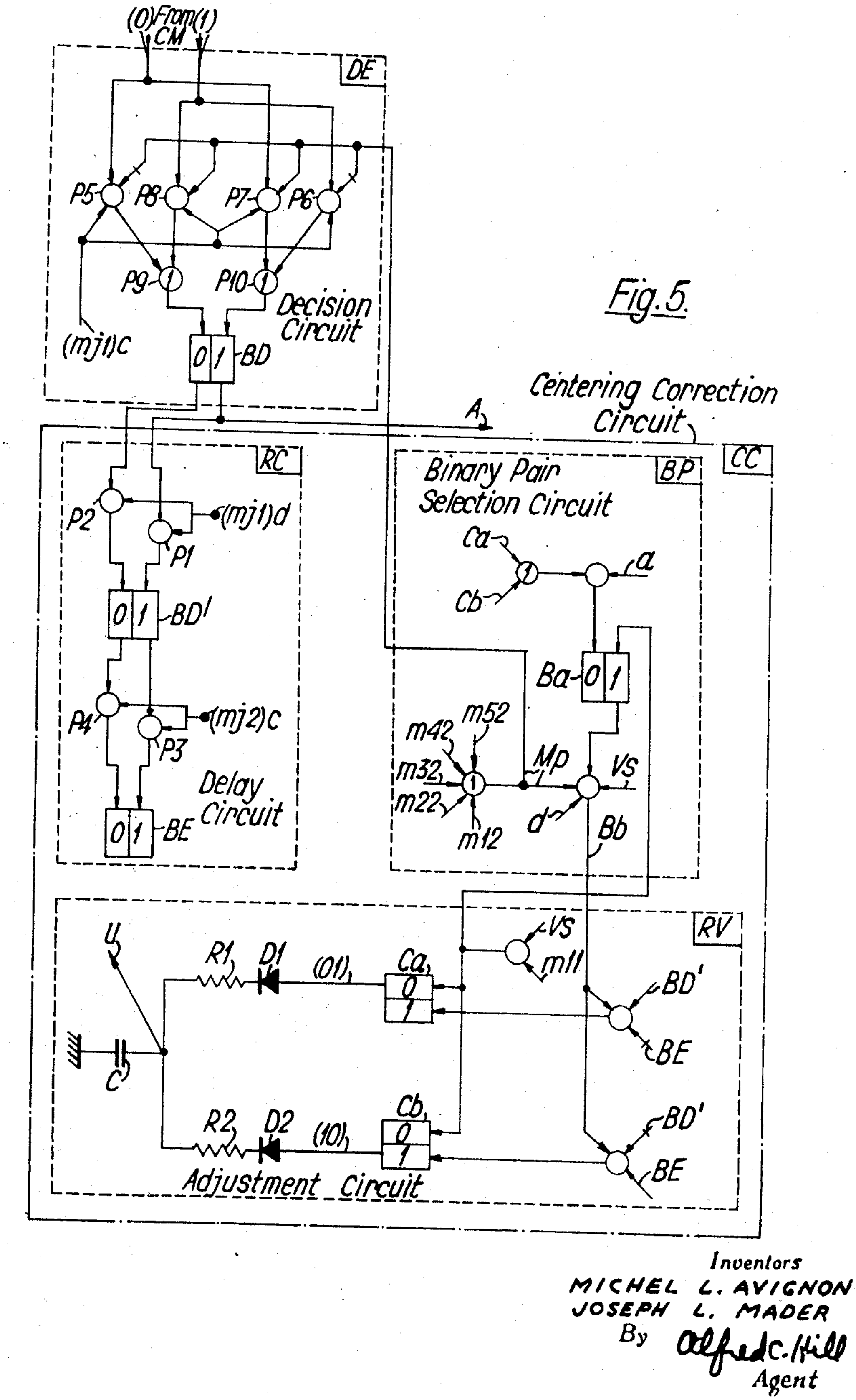
FIG. 5 is a block diagram of the centering circuit of FIG. 4.

Referring to FIGS. **1*a* to 1*e*, the meaning of some symbols used in the block diagrams of FIGS. 4 and 5** are described.

FIG. **1*a*** represents a simple AND gate.

FIG. **1*b*** represents a simple OR gate.

FIG. **1*c* represents an INHIBIT gate having two input terminals 91*f*, 91*g*, and which is blocked when a signal is applied over the inhibit input 91*f***.

FIG. **1*d* represents a bistable circuit or "flip-flop" to which a control signal is applied over one of its input terminals 92–1 or 92–0 in order to set it in the 1 state or to reset it in the 0 state. A voltage of same polarity as that of the control signals is present, either on the output 93–1 when the flip-flop is in the 1 state, or on the output 93–0** when it is in the 0 state. If the flip-flop is referenced B1, the logical condition which characterizes the fact that it is in the 1 state will be written B1 and that characterizing the fact that it is in the 0 state will be written $\overline{B1}$.

FIG. **1*e* represents an electronic gate which, when activated by a signal applied to its input terminal 91*a*, transmits the amplitude of the signal present on the terminal 91*b* to terminal 91*c***.

In feedback comparison coding, the value of each digit is successively determined starting from the most significant digit. Thus, the coding of one sample is performed, for a $n$ digit ternary number, in $n$ ternary digit time slots. If the conditions of the ternary digits 0, 1, 2 are represented, by way of a nonlimitating example, by the pairs of binary bits 01, 00, 10, each ternary digit time slot is subdivided into two binary digit time slots for determining the value of each one of the ternary bits. The binary digit time slots reserved to the ternary digit of rank 1 are referenced m11, m12; the binary digit time slots reserved to the ternary digit of rank 2 are referenced m21, m22; etc... Thus, the $j^{th}$ ternary digit time slot is divided into two binary digit time slots referenced *mj*1 and *mj*2, where for *n*=5 ternary code digit *j* can be equal to 1, 2, 3, 4 or 5. Finally each binary digit time slot is divided into four basic time slots *a*, *b*, *c*, *d*.

Figures 1A, 1B:
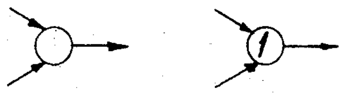
Figure 1C:
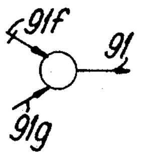
Figure 1D:
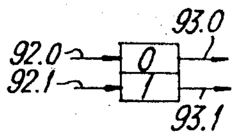
Figure 1E:
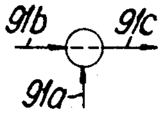
Figure 2:
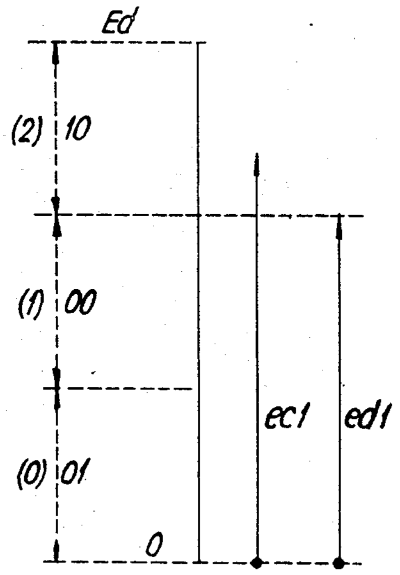
FIG. 2 illustrates a diagram of voltages in a first mode of comparison.

FIG. 2 shows that the most significant ternary digit divides the total coding range of amplitude E*d* into three subranges, and it is realized that the next less significant digit divides each subrange into three equal parts, etc...

At the time m11.*a* (basic time slot *d* of the binary digit time slot m11), which defines the beginning of the coding of the sample *ec*1 represented on FIG. 2, all the flip-flops of one register which comprises 2*n* flip-flops (register RG, FIG. 4) are set to the 0 state with the exception of the most significant one which is set to the 1 state. At times m11.*b* and m11. *c* the decoded voltage *ed*1 (FIG. 0) is compared to the signal *ec*1, this voltage *ed*1 being supplied by decoder DC (FIG. 4) coupled to register RG. If, as in the case of FIG. 2, *ec*1−*ed*1 ≥ 0, (information supplied by comparator CM, FIG. 4) the most significant ternary digit is in condition 2 (pair of binary bits 10 ) and the state of the flip-flops which display this number is not modified. If one has *ec*1 −*ed*1 < 0, the most significant flip-flop of the register is set to the 0 state at the time m11.*c* under the control of the logical control unit LU (FIG. 4) and a new comparison is made at time m12.*b* and m12.*c*. If *ec*1−*ed*1 ≥ 0, the most significant ternary digit is in condition 1 (pair of binary bits 00) and the state of the flip-flops is not modified. Last, if *ec*1 −*ed*1 < 0, the second flip-flop is set to the 1 state at the time m12.*c*, so that the ternary digit is in condition 0 (pair of binary bits 01). At the time m12.*d*, the two most significant flip-flops show the final value of the ternary digit of rank 1.

The same operations are carried out at the following ternary digit time slots for the determination of the ternary digits of decreasing weights and at the time *mn*2.*d*, the code corresponding to the voltage *ec*1 is shown in the register.

TABLE 1 below groups these different operations for the determination of the ternary digits of rank *j* at the times *mj*1 and *mj*2, the two flip-flops being referenced B*j*1 and B*j*2. In the second column, the expression "conditional" means that the command depends upon the result of the comparison.

TABLE I

| Time | Flip Flop command | Comparison | Exact Value of binary bit |
|---|---|---|---|
| mj1.a | Bj1 in the 1 state | | |
| mj1.b | | X | |
| mj1.c | Bj1 in the 0 state (conditional) | | |
| mj1.d | | | X |
| mj2.a | | | |
| mj2.b | | X | |
| mj2.c | Bj2 in the 0 state (conditional) | | |
| mj2.d | | | X |

When alternating voltages of amplitude *ec* ranging between zero and ± E*d*/2 volts (see FIG. 3) are to be coded, *ec*1 = E*d*/2 +*ec* (the voltage *ec* may be positive or negative) so that the inequality *ec*1 −*ed*1≥ 0 (1) becomes: E*d*/2 +*ec*−*ed*1≥ 0 or *ed*1 −*ec* ≤ E*d*/2 (2).

Last, it will be noted that, if the complement of the number written in the register is decoded, the output voltages is *ed*=ED −*ed*1 (see FIG. 3) and that the inequality (1) becomes:

E*d*/2 +*ec*+*ed*−ED ≥ 0;

viz.: *ec*+*ed* ≥ E*d*/2 (3).

It is thus seen that both procedures corresponding to the inequalities (2) and (3), involve a comparison at a level *Ed*/2 different from zero, thus enabling the operation of said comparator at a constant level.

The centering correction consists then in adjusting periodically the amplitude U of a reference voltage of rated value *Ed*/2 according to the sign of the deviation.

For a calibration voltage $e_0$=0, there must be obtained, in a five digit ternary code, the control or calibration code No. =11111. For a very small deviation the less significant digit is in condition 0 or 2. The obtaining of a digit in condition 0 instead of a digit in condition 1 means that the voltage $e_0$ is too small, or that the voltage U may be considered as too high, by including in this voltage the variation of the DC voltages added to the signal *ec* and the variations of the components. The centering correction will, thus, consist in reducing the voltage U when a digit in condition 0 is detected, and to increase it when a digit in condition 2 is detected.

FIG. 4 illustrates a block diagram of a feedback ternary coder incorporating an automatic centering correction arrangement in accordance with the principles of this invention. This coder comprises clock CU, register RG, decoder DC, incoming circuit NP, comparator CM, centering correction circuit CC, and logical control unit LU.

Clock CU delivers the following signals:

a. coding time signals defining the time interval reserved to the coding of a sample into an *n*-digit ternary number. If a time multiplex coding of the signals received over (*s*− 1) analog channels is considered, the clock must deliver *s* signals V1 to V*s*, the signal V*s* defining the calibration time which may also be used for the transmission of a synchronization code; and b. digit time slot signals m11, m12, *mn*2, and basic time slot signals *a*, *b*, *c*, *d*, defined previously.

Register RG comprises 2*n* flip-flops to store the *n* pairs of binary digits representing the *n* ternary digits.

Figure 3:
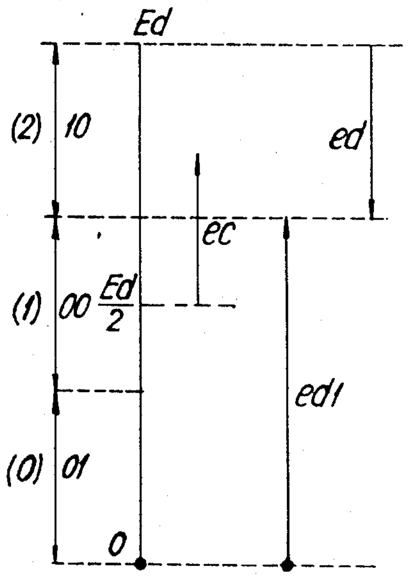
FIG. 3 illustrates a diagram of voltages in a second mode of comparison.

Digital to analog decoder DC is coupled to register RG and supplies the decoded voltage *ed*1 or *ed* (FIG. 3). Such a decoder for ternary codes has been described in the copending application of M. L. Avignon and J. L. Mader, Ser. No. 692,929, Filed Dec. 22, 1967.

Incoming circuit NP receives the input voltages $(ec)_1$ to $(ec)_{s1}$ during the times V1 to V(*s*−*1*) and the calibration voltage $e_0$ =E*d*/2 during the time V*s*. This circuit assures the holding, during the coding time, of the amplitude of the sample *ec* corresponding to one channel.

Comparator CM delivers signals controlling the setting to the 1 state or to the 0 state of the decision flip-flop BD according to the result of the comparison. It will be noted that the fact that the inequality (2), or the inequality (3), is fulfilled means, at time *mj*1 (see TABLE I), that the determined binary bit is 1 whereas at, time *mj*2, this condition means that the determined binary bit is 0. It is thus necessary to reverse the inputs of the flip-flops at each digit time slot in order that the fact that it is in the 1 state (or in the 0 state) means that the digit tested must be kept (or complemented). This switching is represented in FIG. 5. In these conditions, the state of the flip-flop represents, at the basic time slot *d* of each binary digit time slot, the value of the determined binary bit and the code is thus available in series form.

Centering correction circuit CC examines, at time V*s*, successively the value to each ternary digit starting with the most significant ternary digits up to the time where one of these digits is in a condition different from 1. At this digit time slot, the sign of the deviation is given by the condition 0 or 2 of the ternary digit. This information enables the generation of a signal which is applied to comparator CM in such a way as to modify the amplitude of the reference voltage U.

Logical control unit LU controls the flip-flops of register RG in relation to the state of flip-flop BD and according to the rules which have been stated hereinabove.

FIG. 5 illustrates the detailed block diagram of decision circuit DE comprising flip-flop BD (FIG. 4) and centering correction circuit CC. In circuit DE, gates P5 to P10 assure the switching on the inputs of the flip-flop BD, alternatively, to store the fact that the inequality (2) or (3) is fulfilled, meaning that the condition of the digit determined is 1 or 0. This last case appears during an even digit time slot, characterized by the logical condition: $Mp=m12+m22+m32+m42+m52$ set up in the circuit BP of FIG. 5, an odd digit time slot being characterized by the logical condition $\overline{Mp}$. Flip-flop BD is appropriately activated during the time of each ternary digit by gates P5 to P8 under control of the timing signal $(mj1)c$.

It is thus seen that, for the condition $\overline{Mp}\times c$, the outputs (0) and (1) of comparator CM are applied respectively to the inputs 0 and 1 of flip-flop BD and that, for the condition $Mp\times c$, they are applied respectively to the inputs 1 and 0 of this flip-flop. The flip-flop BD shows, at each basic time slot $d$, the value of the binary bit determined at this time, this information being available on conductor A.

Centering circuit CC comprises delay circuit RC, binary pair selection circuit BP, and adjustment circuit RV.

Delay circuit RC comprises flip-flops BD' and BE controlled from flip-flop BD by means of electronic gates P1 to P4. More precisely, the electronic gates P1 and P2 are activated at the time $d$ for each $(mj1)$ time slots enabling the transfer of the state of flip-flop BD to flip-flop BD' and, at the time $c$ for each $(mj2)$ time slots, electronic gates P3 and P4 control the transfer from flip-flop BD' to flip-flop BE. If, for instance, the information received from the comparator CM is considered at the digit time slot $m11$ ($j=1$), it is seen that, in $m12.d$, flip-flops BE and BD' show the values of the two binary bits representing the most significant ternary digit. When $j=2, 3, 4$, and 5, flip-flops BE and BD' will show the value of the binary digits representing the other ternary digits.

Binary pair selection circuit BP delivers a signal $Bb$ for the logical condition $Bb=Ba Vs\times Mp\times d$.

Adjustment circuit RV for the reference voltage controls a modification of the voltage U at the terminals of condenser C in relation with the value of the ternary digits used. To this effect flip-flop $Ca$ is set to the 1 state for the logical condition $Bb\times BD'\times \overline{BE}$ (pair of binary bits 10, ternary condition 2), and flip-flop $Cb$ is set to the 1 state for the logical condition $Bb\times \overline{BD'}\times BE$ (pair of binary bits 01, ternary condition 0).

This centering correction circuit operates as follows: at the beginning of the calibration time, in $Vs.m11$, flip-flops $Ca$ and $Cb$ are set to the 0 state, and flip-flop $Ba$ is set to the 1 state. At each of the following times $m12.d$, $m22.d$, $m32.d$, $m42.d$and $m52.5$, circuit BP delivers a signal $Bb$ which is applied to one of the inputs of the two AND circuits which control flip-flops $Ca$ and $Cb$. If at any of these times one of the binary bits written in flip-flops BE and BD' is different than 0, one of these flip-flops sets to the 1 state as it has been seen hereinabove and flip-flop $Ba$ is set to the 0 state by the logical condition $Ca\times a+b\times a$. The three possible logical conditions are represented in column 1 of TABLE II hereinbelow, the columns 2 and 3 representing, respectively, the condition of the pairs of binary bits and the corresponding ternary condition.

As it has been seen previously, flip-flops $Ca$, $Cb$, are set to the 0 state at time $Vs.m11$, so that a correction started during a calibration time lasts up to the following calibration time. The amplitude of the correction is determined by the value of the resistors through which the current flows toward condenser C.

While we have described above the principles of our invention in connection with specific apparatus, it is to be clearly understood that the description is made only by way of example and not as a limitation to the scope of our invention as set forth in the objects thereof and in the accompanying claims.

We claim:

1. An automatic centering arrangement for a feedback comparison ternary coder comprising:
first means to periodically couple a calibration voltage to said coder during calibration time for providing a given ternary calibration code when said coder is properly centered, said calibration code including a plurality of ternary digits each having a given condition; and
second means coupled to said coder to detect a deviation from said given condition of each one of said plurality of ternary digits of said given calibration code during said calibration time and adjust said coder to compensate for said deviation.

2. An arrangement according to claim 1, wherein:
said given calibration code includes a plurality of ternary 1 digits; and
said second means includes third means coupled to said coder to sequentially examine the condition of each digit of said coded calibration voltage from the most significant ternary digit to the least significant ternary digit;
fourth means coupled to said third means to detect the first digit of said coded calibration voltage deviating from ternary 1 and produce a control signal in response to said deviation; and
fifth means coupled to said fourth means and said coder responsive to said control signal to adjust said coder and compensate for said deviation.

3. An arrangement according to claim 2, wherein:
fifth means includes a source of reference voltage for said coder; and
sixth means coupled to said fourth means and said source responsive to said control signal to adjust the value of said reference voltage to compensate for said deviation.

4. An arrangement according to claim 3, wherein:
said source includes a capacitor; and
said sixth means includes seventh means coupled to said capacitor and said fourth means to control the charge and discharge of said capacitor depending upon the direction of said deviation.

5. An arrangement according to claim 4, wherein:

TABLE II

| Logical Condition | Pair of binary bits | Ternary digit | Voltages $\overline{Ca}$ | Voltages Cb | Diodes D1 | Diodes D2 | Charge of C |
|---|---|---|---|---|---|---|---|
| $\overline{Ca}\times\overline{Cb}$ | 00 | 1 | +2U | 0 | Blocked | Blocked | Constant. |
| $Ca\times Cb$ | 01 | 0 | 0 | 0 | Conductive | do | Decreases. |
| $\overline{Ca}\times Cb$ | 10 | 2 | +2U | +2U | Blocked | Conductive | Increases. |
| 1 | 2 | 3 | 4 | 5 | 6 | 7 | 8. |

It will now be assumed that flip-flops $Ca$ and $Cb$ are made with PNP transistors supplied by a voltage source of amplitude $Ed$. Capacitor C is connected to the 0 output of flip-flop $Ca$ and to the 1 output of flip-flop $Cb$ through diodes D1, D2 and resistors R1 and R2, so that the voltages applied to said condenser are taken, respectively, over the outputs $\overline{Ca}$ and $Cb$ of these flip-flops, as indicated in columns 4 and 5 of TABLE II. Columns 6 and 7 show the conduction state of diodes D1 and D2 for three of the logical conditions defined by the two flip-flops and column 8 indicates the direction of variation of the charge of condenser C according to the established logical condition. It is seen that the charge of this condenser decreases when the ternary condition 0 is detected and increases when the ternary condition 2 is detected, and that the average value of the voltage at the terminals of the condenser is $U=Ed/2$.

said seventh means includes a first bistable device coupled to said fourth means and said capacitor; and
a second bistable device coupled to said fourth means and said capacitor;
each of said bistable devices being in the 0 condition when said control signal indicates a ternary 1,
one of said bistable devices being set to 1 when said control signal indicates a ternary 2 to charge said capacitor, and
the other of said bistable devices being set to 1 when said control signal indicates a ternary 0 to discharge said capacitor.

6. An arrangement according to claim 1, wherein:
said coder includes a source of reference voltage; and
said second means is coupled to said source to adjust the value of said reference voltage to compensate for said deviation.

7. An arrangement according to claim 1, wherein:

each condition of each ternary digit is represented by a different pair of binary digits;

said given calibration code includes a plurality of ternary 1 digits each being represented by the pair of binary digits 00; and third means coupled to said coder to sequentially examine each of said pairs of binary digits of said coded calibration voltage from that pair of binary digits representing the most significant ternary digit to that pair of binary digits representing the least significant ternary digit;

fourth means coupled to said third means to detect the first pair of binary digits of said coded calibration voltage deviating from 00 and produce a control signal in response to said deviation; and fifth means coupled to said fourth means and said coder responsive to said control signal to adjust said coder and compensate for said deviation.

8. An arrangement according to claim 7, wherein:

said fifth means includes a source of reference voltage for said coder, and sixth means coupled to said fourth means and said source responsive to said control signal to adjust the value of said reference voltage to compensate for said deviation.

9. An arrangement according to claim 8, wherein:

said source includes a capacitor; and said sixth means includes seventh means coupled to said capacitor and said fourth means responsive to said control signal to charge said capacitor when said control signal represents a pair of binary digits 10 and to discharge said capacitor when said control signal represents a pair of binary digits 01.

10. An arrangement according to claim 9, wherein:

said seventh means includes a first bistable device coupled to said fourth means and said capacitor; and a second bistable device coupled to said fourth means and said capacitor;

each of said bistable devices being in the 0 condition when said control signal indicates the pair of binary digits 00, one of said bistable devices being set to 1 when said control signal indicates the pair of binary digits 10 to charge said capacitor; and the other of said bistable devices being set to 1 when said control signal indicates the pair of binary digits 01 to discharge said capacitor.